United States Patent Office 3,089,909
Patented May 14, 1963

3,089,909
PRODUCTION OF UNSATURATED ALIPHATIC ALDEHYDES
John Lynn Barclay, Tadworth, David James Hadley, Epsom Downs, and David Gordon Stewart, Epsom, England, assignors to The Distillers Company Limited, Edinburgh, Scotland, a British company
No Drawing. Filed Jan. 25, 1960, Ser. No. 4,219
Claims priority, application Great Britain Feb. 13, 1959
5 Claims. (Cl. 260—604)

The present invention relates to the production of unsaturated aliphatic aldehydes, and in particular to the production of acrolein and methacrolein.

According to the present invention, the process for the production of acrolein or methacrolein comprises reacting at an elevated temperature in the vapour phase propylene or isobutene with oxygen over an oxidation catalyst comprising (i) a mixture of tungsten oxides with the oxides of silver, tin or bismuth, and/or (ii) a compound of silver, tin or bismuth with tungsten and oxygen.

The catalysts used in the process of the present invention must include tungsten, oxygen and either silver, tin or bismuth, and may be regarded either as mixtures of tungsten oxides with, for instance, bismuth oxides, or as oxygen-containing compounds of tungsten, such as silver tungstate, tin tungstate or bismuth tungstate. Under the reaction conditions the catalyst may be present in both forms. The catalyst may be conveniently prepared, for example, by adding an aqueous solution of a bismuth salt to an aqueous solution or suspension of tungstic acid or a tungstic acid salt, and recovering and heating the resulting precipitate. Other suitable catalysts are made by intimately mixing together tungsten oxides with silver, tin or bismuth oxides. The catalyst may, if desired, be deposited on a support such as aluminia or silica.

The ratio of tungsten to the silver, tin or bismuth component of the catalyst may vary within moderately wide limits, but it is preferred to use a molar ratio of between 0.3:1 and 3:1.

The proportion of olefine in the feed may vary within fairly wide limits, for example between 1 and 20% by volume. It is preferred to use between about 2 and 10% by volume of the olefine.

The concentration of oxygen in the feed may also vary within moderately wide limits, for example between 1 and 20% by volume and preferably between 2 and 15% by volume. The oxygen may be diluted with inert gases, and may be, for example, supplied as air.

It is preferred to carry out the reaction in the presence as diluent of a gas which is substantially inert under the conditions of reaction, for example nitrogen, propane, butane, isobutane, carbon dioxide and steam. It is preferred to use steam or nitrogen or mixtures thereof. The concentration of the steam may vary within wide limits for instance between 20 and 60% by volume of the feed. The reaction may be carried out as a fixed bed, or as a fluidised bed process.

The reaction is carried out at an elevated temperature, preferably between 300 and 500° C.

The contact time may be, for example, in the range 1–30 seconds.

The unsaturated aldehyde may be recovered from the reaction products in any suitable manner, for example by countercurrent extraction with water, preferably at an acid pH, followed by fractional distillation.

The process of the invention is further illustrated by the following examples. Parts by weight and parts by volume bear the same relationship as do grams to millilitres.

Example 1

58.9 parts by weight of tin ammonium chloride $((NH_4)_2SnCl_6)$ were dispersed in 150 parts by weight of water at room temperature, and the suspension was added with vigorous stirring to 88 parts by weight of sodium tungstate $(Na_2WO_4.2H_2O)$ dissolved in 150 parts by weight of water. The resultant precipitate was filtered, washed, and dried at 100° C., heated at 400° C. in air for 3 hours and then at 540° C. for 16 hours. The resultant catalyst was then granulated.

34.4 parts by weight of the catalyst were placed in a reactor maintained at 480° C. A gas mixture comprising 9.9% by volume of propylene, 49.0% by volume of air and 41.2% by volume of steam was passed over the catalyst at a rate of 24200 parts by volume per hour measured at N.T.P. (Contact time 3.9 seconds.)

8.6% of the propylene was converted to acrolein and 4.1% was converted to carbon dioxide. The yield based on the propylene consumed was 60 mole percent.

Example 2

68 parts by weight of silver nitrate $(AgNO_3)$ were dissolved in 300 parts by weight of water, and the resultant solution added with vigorous stirring to 66 parts by weight of sodium tungstate $(Na_2WO_4.2H_2O)$ dissolved in 500 parts by weight of water. The resultant precipitate was filtered, washed and dried in air at 100° C. for 16 hours. The silver tungstate catalyst thus produced was sieved and granulated.

36.0 parts by weight of the catalyst were placed in a reactor maintained at 346° C. A gas mixture comprising 9.5% by volume of propylene, 50% by volume of air and 40.5% by volume of steam was passed over the catalyst at a rate of 26420 parts by volume per hour measured at N.T.P. (Contact time 4.0 seconds.)

2.3% of the propylene was converted to acrolein and 0.9% to carbon dioxide. The yield of acrolein based on the propylene consumed was 48 mole percent.

Example 3

A bismuth tungstate catalyst was prepared as follows. 72.8 parts by weight of bismuth nitrate

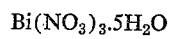

$Bi(NO_3)_3.5H_2O$ were dissolved in 40 parts by volume of water containing 6 parts by volume of concentrated nitric acid. The resulting solution was added with stirring to a solution of 66 parts by weight of sodium tungstate, $Na_2WO_4.2H_2O$ in 60 parts by volume of water containing 5 parts by volume of glacial acetic acid. The resulting precipitate was recovered, washed in water, dried at 80° C. for 16 hours, converted into pellets, and finally heated in air at 540° C. for 16 hours.

A reactor containing 55 grams of the catalyst was maintained at 400° C. in a liquid bath. A gas mixture comprising 10% by volume of propylene, 50% of air and 40% of steam was passed over the catalyst at a rate of 25000 parts by volume per hour measured at N.T.P. (Contact time 3.4 seconds.) 10.8% of the original propylene was converted to acrolein and 70% of the original propylene was recovered unchanged. The yield of acrolein based on propylene consumed was 36 mole percent.

We claim:
1. The process for the production of a substance selected from the group consisting of acrolein and methacrolein which comprises reacting in the vapour phase at about 300–500° C. a substance selected from the group consisting of propylene and isobutene with oxygen in the presence of an inert gaseous diluent over an oxidation catalyst selected from the group consisting of tin tungstate, silver tungstate, and bismuth tungstate, the molar ratio of tungsten to the other metallic elements being within the range of 0.3:1 to 3:1.
2. The process as claimed in claim 1 wherein the catalyst is silver tungstate.

3. The process as claimed in claim 1 wherein the catalyst is tin tungstate.

4. The process as claimed in claim 1 wherein the catalyst is bismuth tungstate.

5. The process which comprises heating a mixture of propylene, inert diluent and air in the vapour phase to 300–500° C. in the presence of bismuth tungstate as catalyst, the molar ratio of tungsten to bismuth being within the range of 0.3:1 to 3:1 to produce acrolein.

References Cited in the file of this patent

UNITED STATES PATENTS 1,588,836    James    June 15, 1926

FOREIGN PATENTS 119,518    Great Britain    Oct. 1, 1918
521,725    Canada    Feb. 14, 1956